United States Patent [19]

Gussin

[11] Patent Number: 4,782,335
[45] Date of Patent: Nov. 1, 1988

[54] VIDEO ART ELECTRONIC SYSTEM

[75] Inventor: Edward L. Gussin, Agoura Hills, Calif.

[73] Assignee: LJN Toys, Ltd., New York, N.Y.

[21] Appl. No.: 925,653

[22] Filed: Oct. 30, 1986

[51] Int. Cl.⁴ .............................................. G09G 3/02
[52] U.S. Cl. .................................. 340/709; 340/703; 273/148 B
[58] Field of Search .................. 340/709, 703, 710; 273/148 B

[56] References Cited

U.S. PATENT DOCUMENTS

| | | | |
|---|---|---|---|
| 4,180,805 | 12/1979 | Burson | 340/709 |
| 4,342,029 | 7/1982 | Hofmanis et al. | 340/703 |
| 4,642,625 | 2/1987 | Tsunehiro et al. | 340/703 |
| 4,658,247 | 4/1987 | Gharachorloo | 340/703 |

OTHER PUBLICATIONS

"Drawing Conclusions" by John J. Anderson, Creative Computing, Dec. 1983, pp. 32-49.

*Primary Examiner*—Donald J. Yusko
*Assistant Examiner*—Tyrone Queen
*Attorney, Agent, or Firm*—Amster, Rothstein & Ebenstein

[57] ABSTRACT

A video art electronic system for drawing and coloring on a conventional color television video monitor includes a first joystick for drawing and a second joystick for coloring. The operation is in real time and is simple enough for a child to operate.

16 Claims, 7 Drawing Sheets

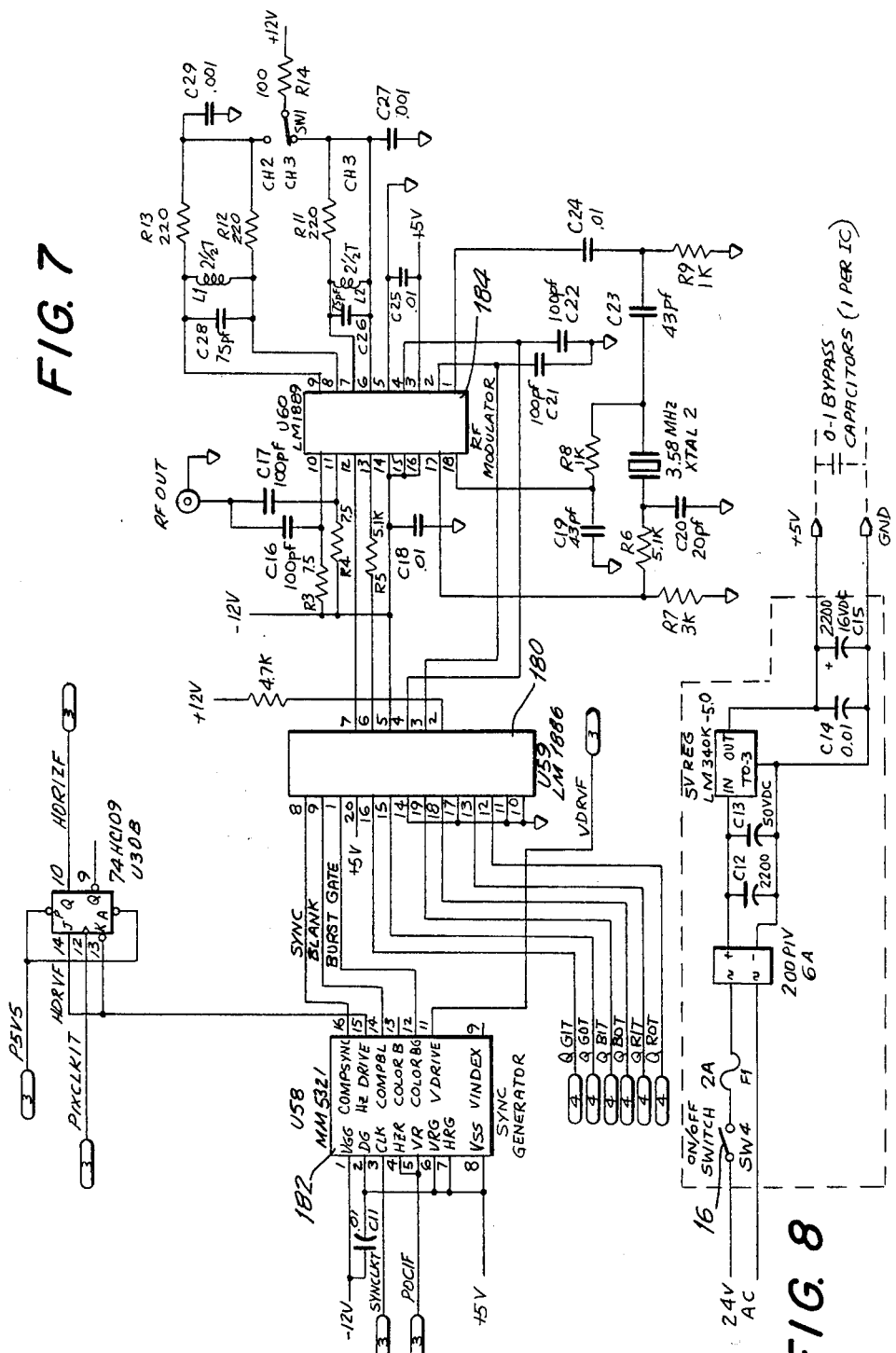

VIDEO ART ELECTRONIC SYSTEM

The invention relates to an electronic system for drawing and coloring on a video monitor and particularly to an electronic system for drawing and coloring on a conventional color television set in real time.

Generally, a drawing on a video monitor is made by illuminating picture elements of the video monitor in a pattern. As used herein, the smallest picture elements or pixels of a video monitor are determined by the horizontal and vertical scanning associated with the display of the video monitor. The term "pixel" is conventional in the art for the highest resolution or smallest picture elements. The term "pixel" is a contradiction of "picture element". In the prior art, there are two general gruops of electronic systems for drawing on a video monitor. In one group of electronic systems, a video monitor such as a concevntional television video monitor is used with a computer such as a personal computer and computer software. A drawing is created by programming the computer to define the end points of a straight line on the video monitor and the computer software creates a continuous straight line between the two end points. Drawing curved lines on the video monitor requires sophisticated computer software. Such electronic systems have may drawbacks including requiring expensive equipment such as a personal computer and special computer software. In addition, a knowledge of computer programming is needed to define the line end points. Furthermore, these electronic systems do not provide real time drawings. As used herein, "real time" refers to drawing and coloring which occur essentially instantaneously with selected commands corresponding thereto.

The other general group of electronic system for drawing on a video monitor requires a computer such as a personal computer, computer software, and a special video monitor responsive to an external stimuli. A drawing is made on the video monitor by interacting the screen of the video monitor with an external stimuli such as a light beam, or a magnetic, or an electrically charged body. Some of these electronic systems are designed to be responsive to a human finger. The special video monitor senses the external stimuli and produces an image such as a dot or line in response thereto. These electronic systems have many drawbacks including being expensive because of the special equipment needed and being imprecise due to the inaccuracy of positioning the external stimuli relative to the video monitor.

The present invention relates to a video art electronic system for drawing and coloring on a conventional color television video monitor and overcomes the drawbacks of the prior art such as requiring a personal computer and computer software. The invention is easily operated and is suitable for use by children. It is a primary object of the present invention to provide a video art electronic system for drawing and coloring on a conventional color television video monitor in real time.

It is a further object of the present invention to provide a video art electronic system for drawing and coloring on a conventional color television video monitor with lines and curves directly under the control of the operator (artist).

It is still a further object of the present invention to provide a video art electronic system for drawing and coloring on a conventional color television video monitor using a cursor displayed on the video monitor to indicate the position at which a drawing can be created.

It is yet a further object of the present invention to provide a video art electronic system for drawing and coloring on a conventional color television video monitor in which the color to be applied to the video monitor corresponds to the color of the cursor displayed at that location.

It is yet still a further object of the invention to provide a video art electronic system for drawing and coloring on a conventional color television monitor in which the position for drawing is controlled by a conventional joystick and the color to be drawn is controlled by another conventional joystick.

In accordance with an illustrative embodiment demonstrating objects and features of the present invention, there is provided a video art electronic system for drawing and coloring on a conventional color television video monitor having pixels and having color images defined by three component colors, red, blue and green. In one preferred embodiment, the system includes a draw switch having a closed position for drawing and coloring on a video monitor and an open position for not drawing and coloring on the video monitor; means to produce first digital signals representing the "X" and "Y" coordinates of a pixel position of a cursor on the video monitor; means to produce second digital signals representing the color of the cursor on the video monitor, a pixel memory comprising a random access memory (RAM) having digital memory addresses corresponding to the pixels and adapted to be read in correspondence with the conventional horizontal and vertical scanning of the video monitor; first connecting means operative when the draw switch is in its closed position to connect the first and second digital signals to the pixel memory so that the color and position of the cursor on the video monitor are written into the pixel memory; means to scan the pixel memory; means to convert output signals from the pixel memory to conventional color television signals; and means to convert the first and second digital signals to conventional color television signals when the draw switch is in its open position, whereby digital signals in the pixel memory are displayed on the video monitor and the cursor is located on the video monitor at the position defined by the first digital signals with a color defined by the second digital signals.

As used herein, the "X" and "Y" coordinates are two coordinates defining the position of a cursor and are preferably orthogonal coordinates but are not limited to such coordinates.

In another embodiment the system includes a draw switch having a closed position for drawing and coloring on the video monitor and an open position for not drawing and coloring on a video monitor; first joystick means operable to produce a first analog signal representing "X" and "Y" coordinates of a pixel position of a cursor on the video monitor; second joystick means operable to produce a second analog signal representing a color of the cursor on the video monitor; digitalizing means operable to time division multiplex the first and second analog signals and to produce an "X" digital signal related to the "X" coordinate of the pixel position, a "Y" digital signal related to the "Y" coordinate of the pixel position, and first and second color digital signals related to the color of the cursor on the video monitor; a first register operable to receive the "X"

digital signal; a second register operable to receive the "Y" digital signal; a third register operable to receive the first color digital signal; a fourth register operable to receive the second color digital signal; a preprogrammed color read only memory (ROM) operable for producing a third color digital signal from the first and second color digital signals, the third color digital signal defining the three color components of the video monitor; a pixel memory comprising a random access memory (RAM) having digital memory addresses corresponding to the pixels and adapted to be read in correspondence with the conventional horizontal and vertical scanning of the video monitor so that the digital memory addresses correspond to possible pairs of "X" and "Y" digital signals for the video monitor; first connecting means operative when the draw switch is in a closed position to connect the first and second registers to the pixel memory and to connect the color ROM to the pixel memory so that the third color signal is written into the pixel memory in a digital memory location corresponding to the "X" and "Y" digital signals in the first and second registers; a fifth register coupled to the pixel memory and operable for reading any third color digital signal at any of the digital memory locations in the pixel memory when the pixel memory is scanned; an "X" address counter coupled to the pixel memory and operable for scanning the digital memory locations in the pixel memory in an "X" direction; a "Y" address counter coupled to the pixel memory and operable for scanning the digital memory locations in the pixel memory in a "Y" direction; second connecting means operative when the "X" and "Y" address counters are scanning the pixel memory to connect the pixel memory to the fifth register for reading any third color digital signals in the pixel memory into the fifth register; an address comparator coupled to the first and second registers and the pixel memory, and operable for comparing the "X" and "Y" digital signals in the first and second registers to the address at each of the digital memory locations in the pixel memory while the X and Y address counters are scanning the pixel memory; the address comparator being operative for connecting the color ROM to the fifth register when both the draw switch is in its open position and the "X" and "Y" digital signals in the first and second register correspond to the address of the pixel memory being scanned; a color matrix coupled to the fifth register and operable for transforming the third color digital signal in the fifth register into analog color signals suitable for producing a conventional color television signal; and a modulator coupled to the color matrix and operable to modulate the analog color signals to produce a conventional color television signal, whereby any third color digital signals in the pixel memory are displayed on the video monitor at positions corresponding to their respective "X" and "Y" digital signals, and the cursor is located on the video monitor at a position defined by the first joystick means with a color defined by the second joystick means.

The above description as well as further objects, features and advantages of the present invention will be more fully understood by reference to the following detailed description of the presently preferred, but nevertheless illustrative embodiment in accordance with the present invention, when taken in conjunction with the accompanying drawings, wherein:

FIGS. 3 to 8 are an electrical circuit diagram of the video art electronic system depicted in FIG. 2.

Figure 1:
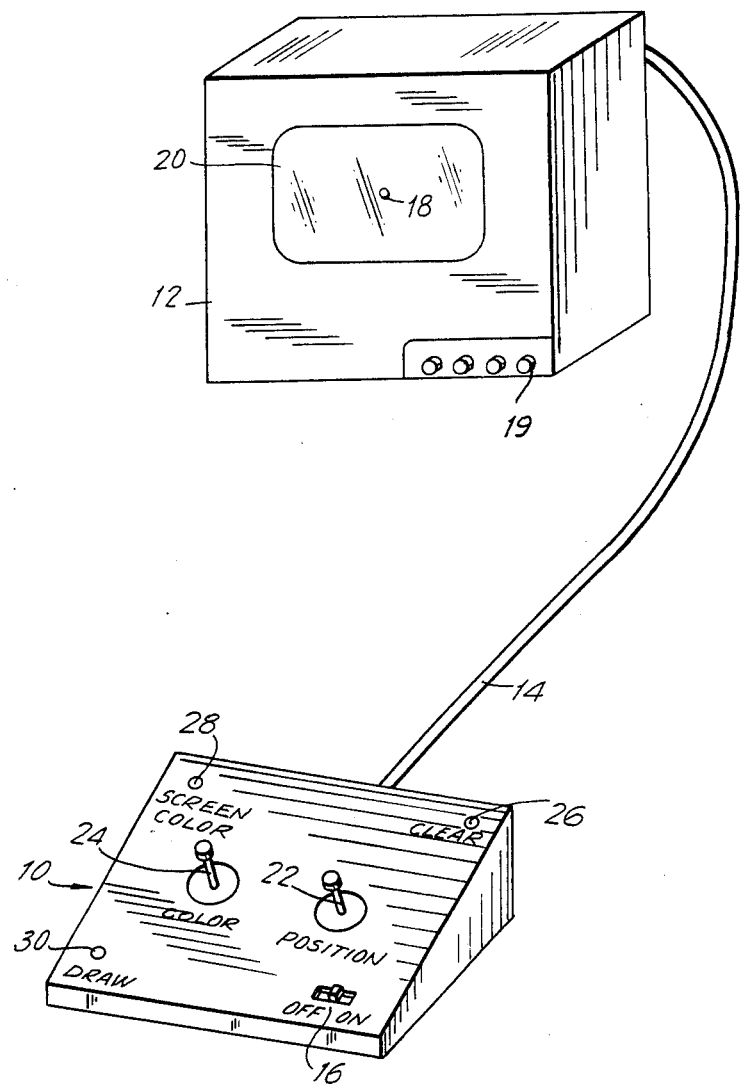
FIG. 1 is a perspective view of a video art electronic system for drawing and coloring on a conventional color video monitor according to the invention connected to a conventional color television set.

Referring to FIG. 1, a video art electronic system for drawing and coloring on a conventional color television video monitor according to the invention is generally represented by the numeral "10". The electronic system 10 is connected to a conventional color television set 12 by a cable 14 which is connected to the antenna input terminals (not shown) of the television set 12 in the same manner as a cable from an antenna would be connected. The television set 12 has control knobs 19. When the television set 12 and switch 16 are turned on, a cursor 18 appears on video monitor 20 in a position determined by the position of a conventional joystick 22 under the control of the operator. Manipulation of the joystick 22 is so easily accomplished that the joystick 22 can be operated by a young child. A conventional joystick 24 is used by the operator to determine the color of the cursor 18. The color of the cursor 18 can vary from white to black as well as a spectrum of colors including shades of red, blue, green and combinations thereof. The use of a joystick to determine color on a video monitor is known in the art and easily operated.

Generally, a "joystick" as used herein, is a control device including a control in the form of a handle with freedom of motion in two directions, usually orthogonal directions and the position of the handle establishes two coordinate values which can be transformed into at least one signal, usually two signals.

The electronic system 10 is operated as follows. The operator manipulates the joystick 22 and visually observes the position of the cursor 18. The color of the cursor 18 is varied by the use of the joystick 24. If a drawing is to be made at the position of the cursor 18 in the color of the cursor 18 at that position, then the "DRAW" switch 30 is pressed and this establishes or "draws" a colored dot on the video monitor 20 at the position of the cursor 18. Thereafter, movement of the cursor 18 or changing the color of the cursor 18 does not disturb the position and the color of the dot "drawn" on the video monitor 20. It is, however, possible to draw over a previous drawing to cancel a portion of the drawing or to change the color of a drawing. A previously drawn "dot" can be cancelled by setting the cursor 18 at the position desired, selecting its color to be "black", and thereafter closing the "DRAW" switch 30. The color "black" is the absence of any other color so that the "black" pixel is a pixel with no color drawn in it. A continuous line can be drawn by maintaining the switch 30 in its "on" position and using the joystick 22 to move the cursor 18 around the video monitor 20. An entire drawing on the video monitor 20 can be removed by using the "CLEAR" switch 26. The video monitor 20 can be set to a background color by the use of the joystick 24 and the "SCREEN COLOR" switch 28 being closed after a desired color has been determined using the joystick 24.

Figure 2:
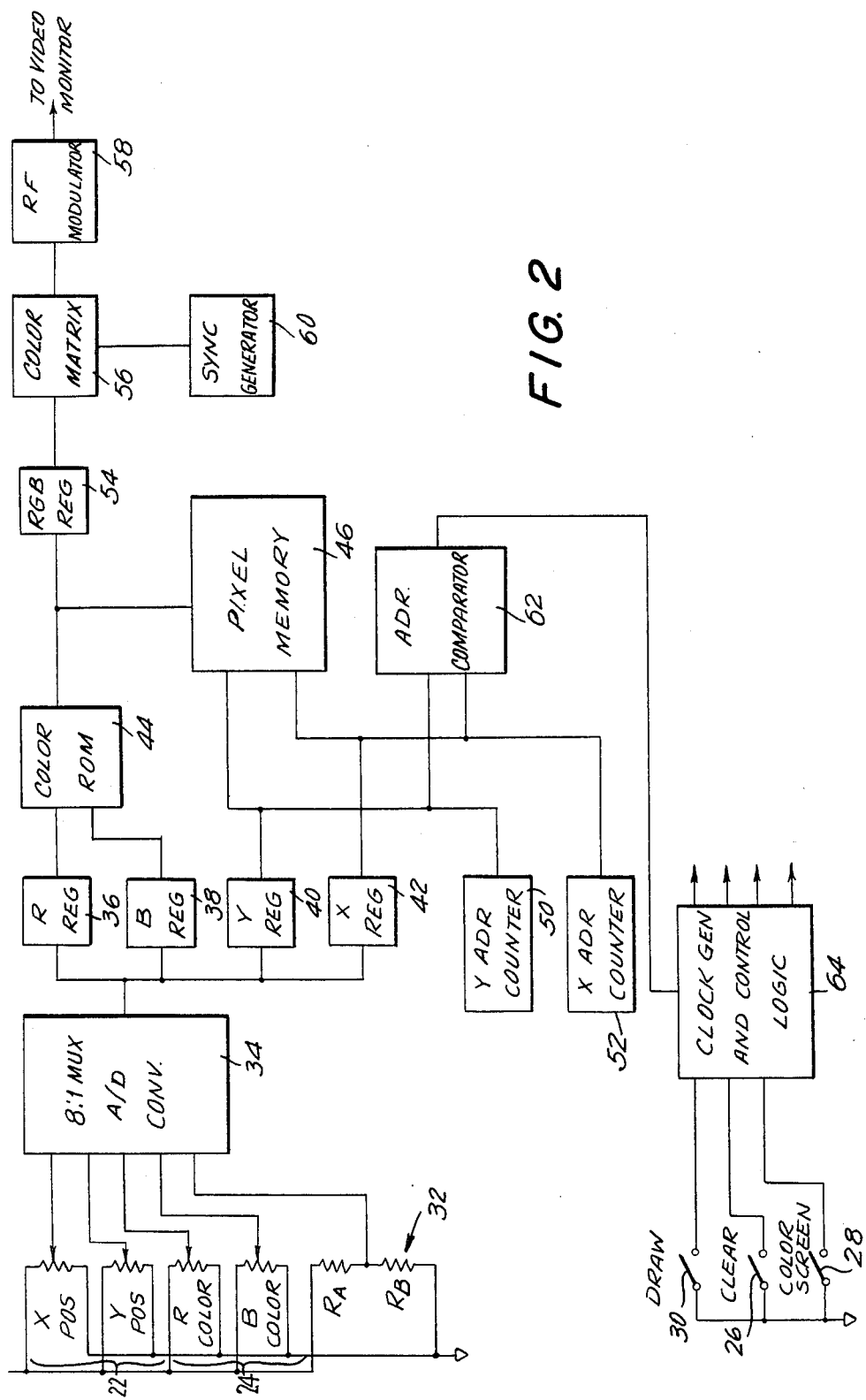
FIG. 2 is a simplified block diagram of the video art electronic system for drawing and coloring shown in FIG. 1.

Referring now to FIG. 2, there is shown a simplified block diagram of the video art electronic system. The joystick 22 has a conventional schematic representation of two potentiometers, one labeled "X POS" and the other labeled "Y POS" to represent two orthogonal coordinate variables relating to the position of a pixel, that is the position of the cursor 18 on the video monitor 20. Similarly, the joystick 24 is represented by two potentiometers, one labeled "R COLOR" and the other labeled "B COLOR". These labels are not to be construed as limiting the possible colors available to only two, such as red and blue. Actually, the joystick 24 produces a wide spectrum of colors including black and white; however, the schematic used for joystick 24 is the conventional representation of a color joystick. A voltage divider 32 includes resistor $R_a$ and $R_b$ and the setting of the voltage divider 32 determines the background light level when the CLEAR switch 26 is pressed. Generally, the voltage divider 32 is set so that $R_a$ equals $R_b$. The output signals from the joystick 22 are analog signals, the X POS signal and the Y POS signal. The output signals from the joystick 24 are analog signals, the R COLOR signal and the B COLOR signal. The output signals from the joysticks 22 and 24 are coupled to a combined multiplexer and analog to digital converter 34 which time division multiplexes 8:1 and converts analog signals to digital signals. While a 4:1 time division multiplexer could be used to sample the four analog signals from the joysticks 22 and 24, it is convenient to use an 8:1 multiplexer because it is a commercially available unit readily available at a relatively low cost as compared to a 4:1 time division multiplexer.

The multiplexer and A/D converter 34 produces an eight bit data word for each of the analog signals at its input terminals. Thus, the multiplexer and A/D converter 34 produces two color data output signals and two pixel position data output signals. The two color data output signals from the multiplexer and A/D converter 34 are coupled to R register 36 and B register 38, respectively while the two pixel position data output signals from of the multiplexer and A/D converter 34 are coupled to Y register 40 and X register 42, respectively. The eight bit data words corresponding to the R COLOR signal and the B COLOR signal are latched into registers 36 and 38, respectively. The eight bit data words corresponding to the X POS signal and Y POS signal are latched into registers 42 and 40, respectively. The conversion timing in the multiplexer and A/D converter 34 is corelated to the conventional television scanning to produce a picture on the color television set 12. The analog to digital conversion in the multiplexer and A/D converter 34 takes place during every 16th horizontal retrace and each vertical retrace of the display on the video monitor 20. The conventional television picture as set forth by the National Television System Committee (NTSC) has established a scanning rate of thirty frames per second as a standard. The video art electronic system according to the invention is adapted to produce a standard NTSC signal format which includes vertical and horizontal synchronizing signals.

The eight bit signals latched in the R register 36 and B register 38 contain the color representation according to the joystick 24 and these registers 36, 38 are coupled to a color read only memory (ROM) 44. A ROM is a conventional device having stored information which can be read but can not be changed during its normal operation. The stored information is usually incorporated in the ROM during manufacturing and cannot be changed during normal use of the ROM. The color ROM 44 contains a conversion table which converts the eight bit signals in the R register 36 and B register 38 which correspond to the position of the joystick 24 to a single six bit data word in which two bits represent the intensity of the color red, two bits represent the intensity of the color blue and two bits represent the intensity of the color green. The output terminals of the color ROM 44 are coupled to the data lines of pixel memory 46. The pixel memory 46 comprises conventional random access memories. A random access memory (RAM) is a conventional storage device from which information can be retrieved with a speed independent of the location or address of the information in the storage device. Information can be written into and read out of the RAM and information in the RAM can be changed at any time during normal operations. The addresses of the information in the pixel memory 46 correspond to a division of video monitor 20 into 128 rows and 170 colunns or the equivalent of 21,760 picture elements, or pixels. Information as to a picture to be displayed on video monitor 20 is represented electronically by data words stored in the pixel memory 46 at addresses corresponding to the address of the pixels of the video monitor 20. During the operation of the electronic system, the pixel memory 46 is scanned and read at the rate of 30 frames per second and the data read from the pixel memory 46 is converted to the standard NTSC signal format. If the DRAW switch 30 is closed at the end of a conversion cycle of the multiplexer and A/D converter 34, the position of the joystick 24 determines a six bit color data word from the color ROM 44 which is enabled onto data lines coupled into the pixel memory 46 and the position of the joystick 22 determines output signals from the registers 40 and 42 which are also enabled into the pixel memory 46 to provide the address of the six bit color data word. As a result, the six bit color data word from the color ROM 44 is recorded at the address corresponding to the coordinates of the pixel on the video monitor 20 at which the cursor 18 is located.

Y ADR COUNTER 50 and X ADR COUNTER 52 are coupled to the pixel memory 46 and are used to scan the pixel memory 46 continuously. The X ADR COUNTER 52 is reset during each horizontal synchronizing signal pulse for the video display 20 and is clocked at a rate which yields 170 pixels per scanline. The Y ADR COUNTER 50 is reset during each vertical synchronizing signal for the video display 20 and is clocked by each horizontal synchronizing signal. This counting sequence creates a conventional raster scan data format as the pixel memory 46 is read. The output signals of the pixel memory 46 are latched into a register labeled RGB register 54 during each memory access. The output signal of the RGB register 54 is coupled to the input circuit of a color matrix 56. The color matrix 56 includes a conventional television video matrix digital to analog converter which encodes luminance and color difference signals from red, green, and blue input signals. The color matrix 56 is coupled to RF modulator 58 to produce a conventional television signal. SYNC GENERATOR 60 provides standard television synchronizing signals.

The cursor 18 is displayed on the video monitor 20 when the DRAW switch 30 is not closed by the use of ADR comparator 62. The output signals from the Y register 40 and X register 42 are connected to one side of the ADR comparator 62 and the output signals of the Y ADR counter 50 and Z ADR counter 52 are connected to another side of the ADR comparator 62. The ADR comparator 62 compares the pixel address being read in the pixel memory 46 to the cursor 18 display address determined by the joystick 22. When the pixel address matches the display address, the output signal of the color ROM 44 is latched into the RGB register 54, thereby producting a "dot" at the pixel corresponding to cursor 18 on the video monitor 20.

When the CLEAR switch 26 is closed, the output terminal of the voltage divider 32 is selected by the multiplexer and A/D converter 34 and latched into the R register 36 and B register 38. This data value is written into each address of the pixel memory 46 thereby clearing the memory of the pixel memory 46 to produce a clear screen on the video monitor 20. When the SCREEN COLOR switch 28 is closed, the output of the joystick 24 is selected by the multiplex and A/D converter 34 and written into each address in the pixel memory 46, resulting in the entire screen of the video monitor 20 being the color designated by the joystick 24. The various clocks and control logic have been represented by a numeral 64, but no interconnections are indicated in order to simplify FIG. 2. Such interconnections, however, are shown in FIGS. 3 to 8.

Referring now to FIGS. 3 to 8, an electrical circuit diagram of a preferred embodiment of the invention is shown in detail. The complexity of the electrical circuitry requires six sheets in order to show the entire electrical circuit diagram. Electrical lines which continue from one sheet to another sheet are terminated in an oval and the numeral in the oval indicates the figure where a continuation of the line can be found. This is a conventional notation. An arbitrary system of identifying electrical lines has been used in order to identify the same electrical line on different sheets.

Commercially available components have been used in the circuit shown in the FIGS. 3 to 8. These components are represented by blocks and identified in conventional terms such as inverters, gates, counters, registers, ROM, RAM's, comparators, modulators, digital to analog converters and the like in Table 1. The blocks in FIGS. 3 to 8 are identified by a "U" number and, where applicable, a commercially used device type number. Table 1 shows the "U" number, device type number, and conventional device name for integrated circuits represented by blocks in the FIGS. 3 to 8. Equivalent commercial devices are available. Table 2 relates the "U" numbers, device type number, and pins receiving the Vcc(+5 volts) and the ground connections.

TABLE 1

| IC | DEVICE TYPE | COMMON NAME |
|---|---|---|
| U1 | ADC0808 | MULTIPLEXER A/D CONV |
| U2, U3 | 74HC377 | FLIP-FLOP |
| U4, U5, U23 | 74HC378 | FLIP-FLOP |
| U6, U9, U15, U17 | 74HC244 | BUFFER |
| U7 | 2732A-2 | ROM |
| U10, U11 | 74HC688 | COMPARATOR |
| U12, U13, U16, U18, U25, U38, U57 | 74HC163 | COUNTER |
| U14, U27, U31 | HM6264 | RAM |
| U20 | 74HC139 | DEMULTIPLEXER |
| U21, U55 | 74HC32 | OR GATE |
| U22, U36, U56 | 74HC00 | NAND GATE |
| U26, U33 | 74HC175 | FLIP-FLOP |
| U29, U51 | 74HC04 | INVERTER |
| U30, U50 | 74HC109 | FLIP-FLOP |
| U35, U54 | | 1K PULLUP PACK |
| U53 | 74HC164 | SHIFT REGISTER |
| U58 | MM5321 | SYN GENERATOR |

TABLE 1-continued

| IC | DEVICE TYPE | COMMON NAME |
|---|---|---|
| U59 | LM1886 | D/A CONVERTER |
| U60 | LM1889 | RF MODULATOR |

TABLE 2

| IC | DEVICE TYPE | Vcc (+5 V) PIN | GND PIN |
|---|---|---|---|
| U1 | ADC0808 | 11 | 13 |
| U2, U3, U4, U5, U23 | 74HC377 | 20 | 10 |
| U4, U5, U23 | 74HC378 | 16 | 8 |
| U6, U9, U15, U17 | 74HC244 | 20 | 10 |
| U7 | 2732A-2 | 24 | 12 |
| U10, U11 | 74HC688 | 20 | 10 |
| U12, U13, U16, U18 U25, U38, U57 | 74HC163 | 16 | 8 |
| U14, U27, U31 | HM6264 | 28 | 14 |
| U20 | 74HC139 | 16 | 8 |
| U21, U55 | 74HC32 | 14 | 7 |
| U22, U36, U37, U56 | 74HC00 | 14 | 7 |
| U26, U33 | 74HC175 | 16 | 8 |
| U29, U51 | 74HC04 | 14 | 7 |
| U30, U50 | 74HC109 | 16 | 8 |
| U35, U54 | | 14 | — |
| U53 | 74HC164 | 14 | 7 |
| U58 | MM5321 | 8 | — |
| | | | −12 v at 1 pin |
| U59 | LM1886 | — | 5 |
| U60 | LM1889 | — | 5 |

Figure 3:
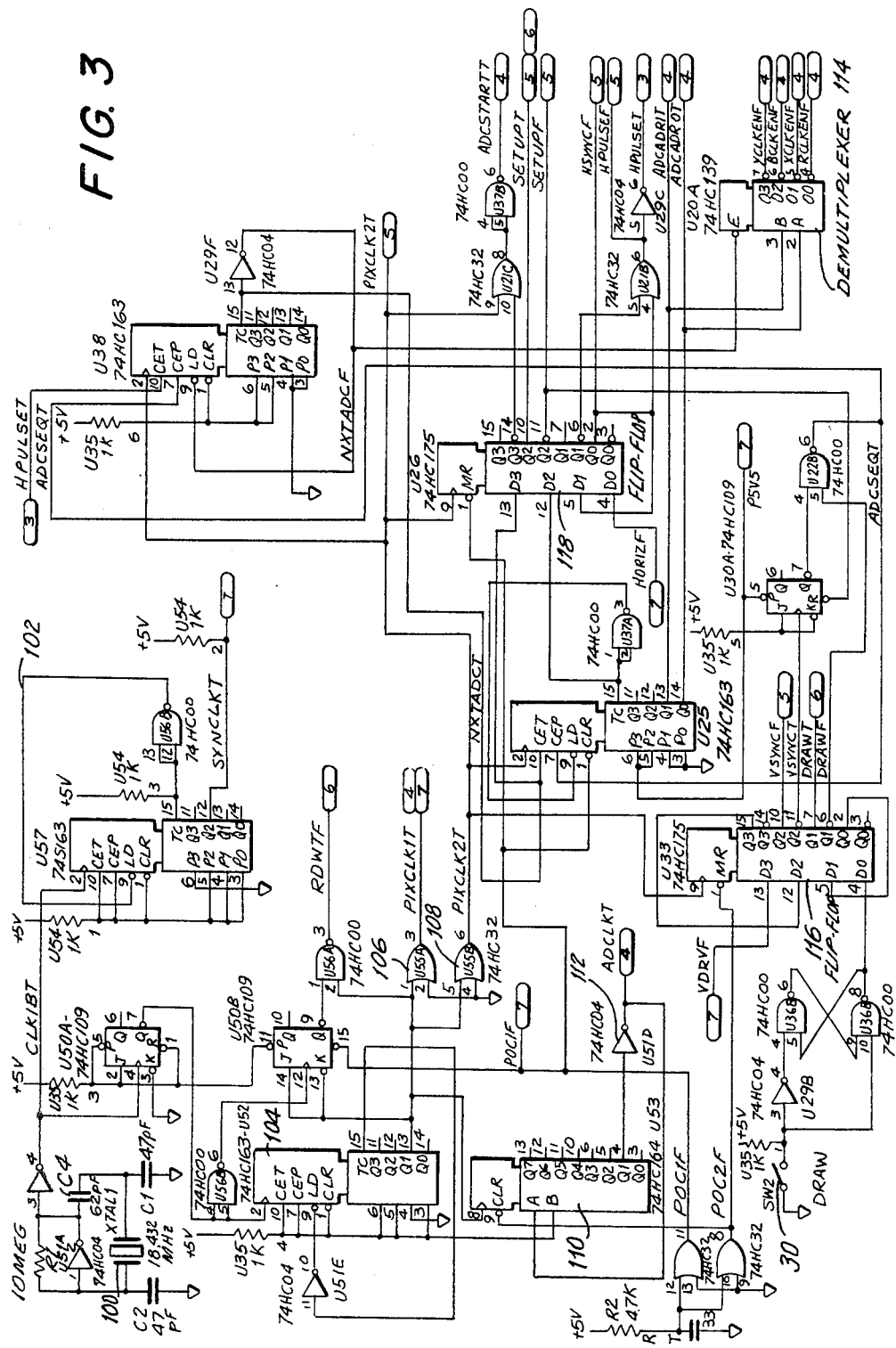

FIG. 3 shows components and connections lines corresponding, in part, generally to the clock generator and control logic 64 shown in FIG. 2. Quartz crystal 100 produces a reference signal from which other timing and synchronizing signals are derived. Generally, electrical lines having an identification including "CLK" are carrying timing or "clock" signals, and the lines having identifications including the letters "SYNC" are carrying synchronizing signals. The following are some examples of these clock and synchronizing electrical lines shown in FIG. 3. Binary counter 102 has an output line 12 labeled "SYNCLKT." Binary counter 104 has output line 13 connected to OR gates 106 and 108 which have output lines labeled "PIXCLKIT" and "PIXCLKIT", respectively. Shift register 110 has output line 4 connected to inverter 112 which has an output line labeled "ADCLKT". Demultiplexer 114 has output lines 4, 5, 6 and 7 labeled "RCLKENF", "XCLKENF", "BCLKENF" and "YCLKENF", respectively. Flip-flop 116 has output lines 10 and 11 labeled "VSYNCF" and "HSYNCF", respectively. Flip-flop 118 has output line 2 labeled "HSYNCF" FIG. 3 also includes DRAW switch 30.

Figure 4:
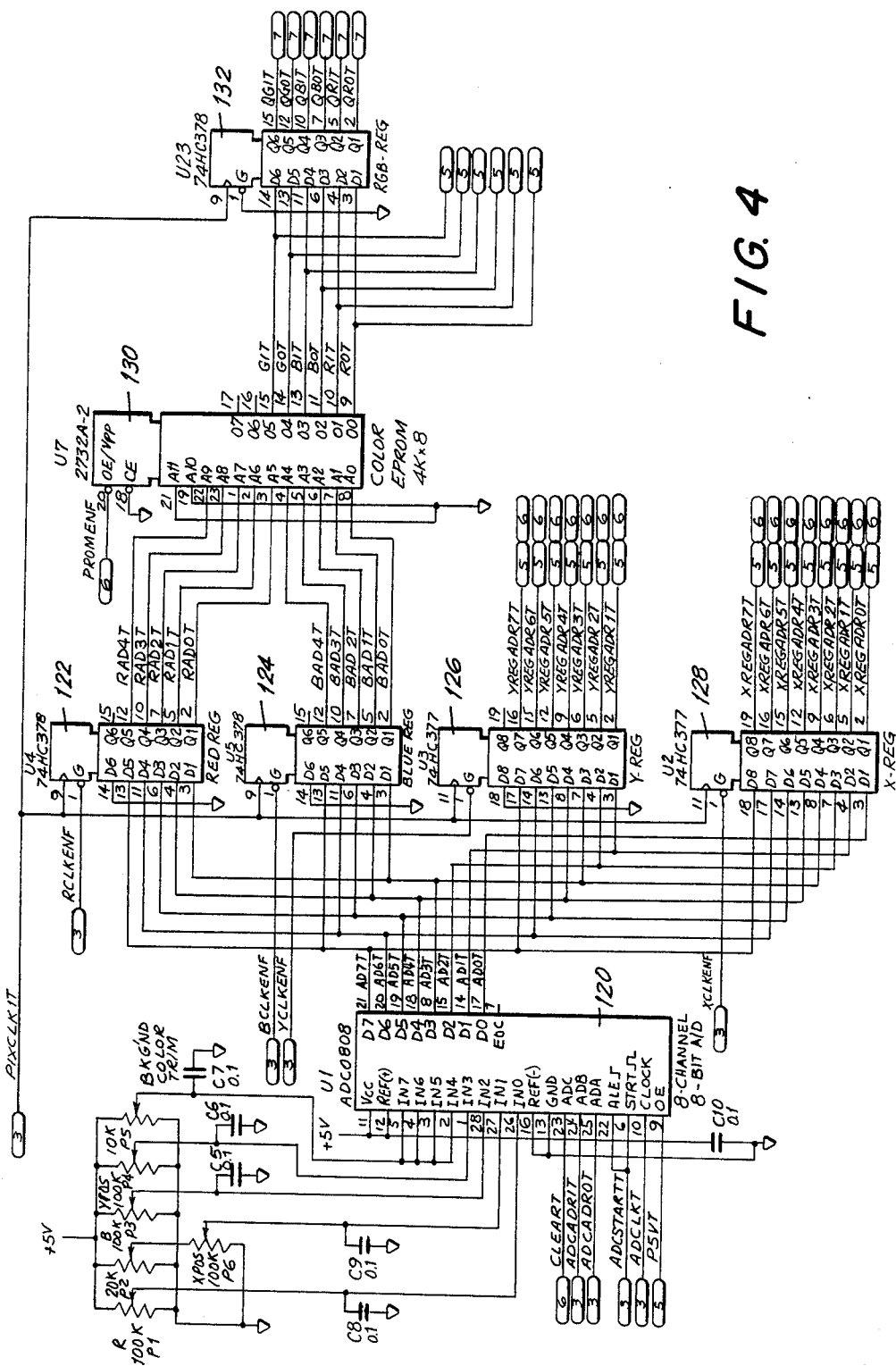

FIG. 4 shows potentiometers P2 and P3 which represent the color joystick 24 and potentiometers P6 and P4 which represent the position joystick 22. The multiplex and A/D converter 34 includes block 120. Terminal 10 of the block 120 is an input terminal for a clock signal from line ADCLKT which originates from FIG. 3. The R register 36 includes block 122 which includes a plurality flip-flops. The B register 38 includes block 124 which also includes a plurality flip-flops. Similarly, the Y register 40 and X register 42 respectively include blocks 126 and 128, both of which include a plurality of flip-flops. The color ROM 44 includes block 130 which is a programmable read only memory (ROM). The programming of the color ROM 44 is carried out in accordance with conventional practices so that a predetermined output signal results from a predetermined set of input signals. The RGB register 54 includes block 132 which includes flip-flops.

Figure 5:
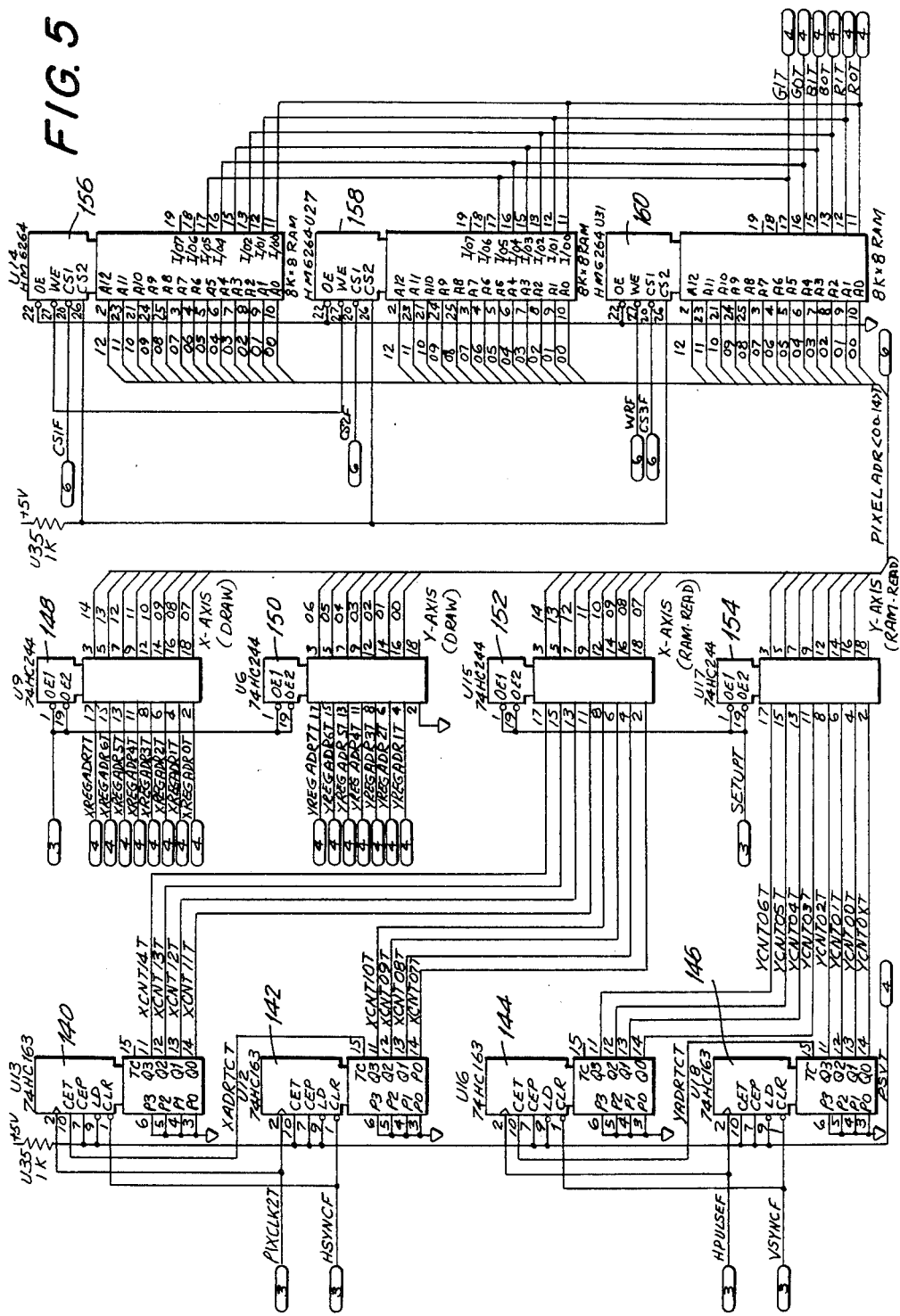
Figure 6:
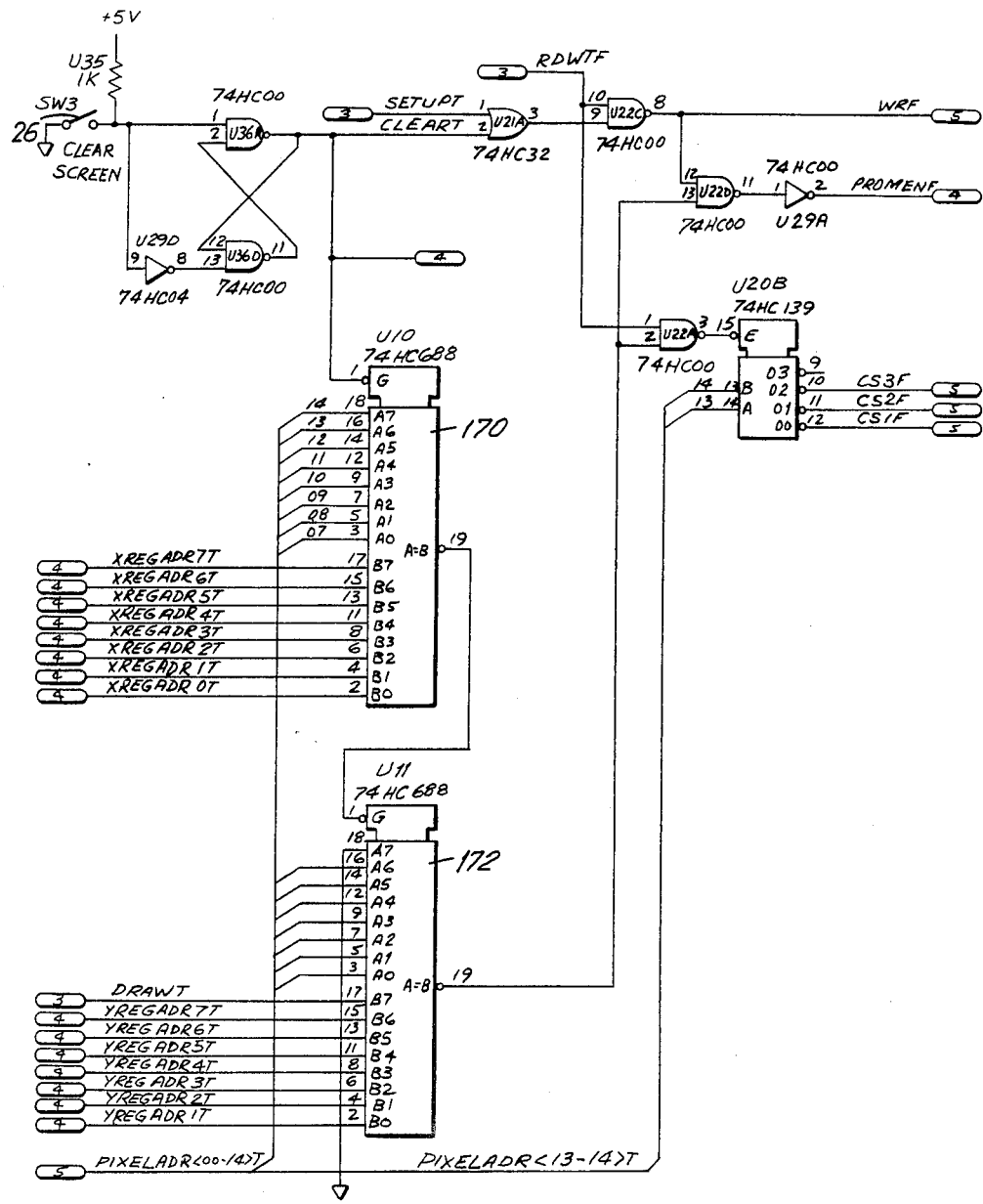

FIG. 5 shows blocks 140 and 142 which are binary counters and are part of the the Y ADR counter 50. The X ADR counter 52 includes blocks 144 and 146 which are also binary counters. Blocks 148, 150, 152 and 154 are buffer and line drivers which are used conventionally in order to provide strong signals and to minimize interference between components. The pixel memory 46 includes blocks 156, 158 and 160 each of which is a random access matrix (RAM). FIG. 6 shows blocks 170 and 172 which are comparators and are part of the ADR comparator 62. In FIG. 7, it can be seen that the color matrix 56 includes block 180 which is a digital to analog converter. The SYNC generator 60 includes block 182 which is a signal generator for providing a synchronizing signal for the display on the video monitor 20. The RF modulator 58 includes block 146 which is a modulator at radio frequencies (rf). FIG. 8 shows a conventional low voltage power supply for producing 5 volts direct current from 24 volts alternating current.

Although the invention herein has been described with reference to a particular embodiment, it is to be understood that this embodiment is merely illustrative of the principal and application of the invention. Thus, it is to be understood that numerous modifications may be made in the illustrative embodiment and other arrangements may be devised without departing from the spirit and scope of the invention.

I claim:

1. A video art electronic system for drawing and coloring on a conventional color television video monitor including a television screen having predetermined pixels, comprising:
   a draw switch having a first position for drawing and coloring on the video monitor and a second position for not drawing and coloring on the video monitor;
   means including a first joystick to produce first digital signals representing the "X" and "Y" coordinates of a pixel position of a cursor on the video monitors;
   means including a second joystick to produce second digital signals representing the color of the cursor on the video monitor;
   a pixel memory comprising a random access memory (RAM) having digital memory addresses corresponding to the pixels and adapted to be read in correspondence with the conventional horizontal and vertical scanning of the video monitor;
   first connecting means operative when the draw switch is in its first position to connect said first and second digital signals to said pixel memory so that the color and position of the cursor on the video monitor are written into said pixel memory;
   means to convert output signals from said pixel memory to conventional color television signals; and
   means to convert said first and second digital signals to conventional color television signals when said draw switch is in its second position, whereby digital signals in said pixel memory are displayed on the video monitor and the cursor is located on the video monitor at the position defined by said first digital signals with a color defined by said second digital signals.

2. A video art electronics system for drawing and coloring on a conventional color television video monitor including a television screen having predetermined pixels, said system comprising a first and a second member positionably movable by an operatir, the drawing and coloring being by way of real-time positional and color correspondence of a cursor movably displayed on the screen with the current positions of said first and second members, the position of said first member representing commanded position of the cursor on the screen and the position of said second member representing commanded color of the cursor,
   said system being operable in a first mode of drawing and coloring in which currently commanded position and currently commanded color of the cursor are replicated on the screen in real time on a durable and cumulatively up-to-date basis as a durable trace of the cursor movement, so that the screen durably displays the executed drawing and currently commanded coloring traces up-to-date,
   said system being operable in a second mode of not drawing and coloring in which the screen continues to display durably the traces as last previously brought up-to-date and in which the currently commanded position and color of the cursor are replicated by the cursor displayed on the screen, but without new and current formation of a durably displayed trace,
   said system further comprising:
   a draw switch having a first position for invoking said first mode of drawing and coloring on the video monitor and a second position for invoking said second mode of not drawing and coloring on the video monitor; and
   means operative in either mode and responsive to said first member to produce first digital signals representing the commanded "X" and "Y" coordinates of the pixel position of the cursor on the screen.

3. A system of claim 1, wherein said means to produce first digital signals comprises a multiplexer.

4. A system of claim 3, wherein said means to produce first digital signals further comprises an analog to digital converter.

5. The system of claim 1, wherein said means to produce second digital signals comprises a multiplexer.

6. The system of claim 5, wherein said means to produce second digital signals further comprises an analog to digital converter.

7. The system of claim 1, wherein said means to produce first digital signals comprises a digital register.

8. Ths system of claim 1, wherein said means to produce second digital signals comprises a digital register.

9. The system of claim 1, further comprising means to scan said pixel memory.

10. A system of claim 1, wherein said means to produce second digital signals comprises a color read only memory (ROM).

11. A system as claimed in claim 1, wherein both said means to convert to conventional color television as a channel common thereto; a color matrix operatable for transforming said output signals from the pixel memory or said second digital signals, to analog color signals suitable for producing a conventional color television signal, and a modulator coupled to said color matrix and operable to modulate said analog color signals to produce a conventional color television signal.

12. The system of claim 1, further comprising means for clearing the video monitor.

13. The system of claim 1, further comprising means to background color the video monitor with a color corresponding to said second digital signals.

14. A video art electronic system for drawing and coloring on a conventional color television video monitor including a television screen having predetermined pixels, comprising:

a draw switch having a first position for drawing and coloring on the video monitor and a second position for not drawing and coloring on the video monitor;

first joystick means operable to produce a first analog signal representing "X" and "Y" coordinates of a pixel position of a cursor on the video monitor;

second joystick means operable to produce a second analog signal representing a color of said cursor on the video monitor;

digitizing means operable to time division multiplex said first and second analog signals and to produce an "X" digital signal related to the "X" coordinate of said pixel position, a "Y" digital signal related to the "Y" coordinate of said pixel position, and first and second color digital signals related to the color of said cursor on the color video monitor;

a first register operable to receive said "X" digital signal;

a second register operable to receive said "Y" digital signal;

a third register operable to receive said first color digital signal;

a fourth register operable to receive said second color digital signal;

a preprogrammed color read only memory (ROM) operable for producing a third color digital signal from said first and second color digital signals, said third color digital signal defining the three color components of the video monitor;

a pixel memory comprising a random access memory having digital memory addresses corresponding to said pixels and adapted to be read in correspondence with the conventional horizontal and vertical scanning of the video monitor so that said digital memory addresses correspond to possible pairs of "X" and "Y" digital signals for the video monitor;

first connecting means operative when the draw switch is in a first position to connect said first and second registers to said pixel memory and to connect said color ROM to said pixel memory so that said third color signal is written into said pixel memory at a digital memory location corresponding to said "X" and "Y" digital signals in said first and second registers;

a fifth register coupled to said pixel memory and operable for reading said third color digital signal at said digital memory location in said pixel memory when said pixel memory is scanned;

an "X" address counter coupled to said pixel memory and operable for scanning the digital memory locations in said pixel memory in an "X" direction;

a "Y" address counter coupled to the pixel memory and operable for scanning the digital memory locations in said pixel memory in a "Y" direction;

second connecting means operative when said "X" and "Y" address counters are scanning said pixel memory to connect said pixel memory to said fifth register for reading any third color digital signals in said pixel memory into said fifth register;

an address comparator coupled to said first and second registers and said pixel memory, and operable for comparing the "X" and "Y" digital signals in said first and second registers to the address at each of the digital memory locations in said pixel memory while said "X" and "Y" address counters are scanning said pixel memory; said address comparator being operative for connecting said color ROM to said fifth register when both said draw switch is in its second position and the "X" nd "Y" digital signals in said first and second register correspond to the address of said pixel memory being scanned;

a color matrix coupled to the fifth register and operable for transforming said third color digital signal in said fifth register into analog color signals suitable for producing a conventional color television signal; and a modulator coupled to the color matrix and operable to modulate said analog color signal to produce a conventional color television signal, whereby any third color digital signals in said pixel memory are displayed on the video monitor at positions corresponding to their respective "X" and "Y" digital signals and said cursor is located on the video monitor at a position defined by said first joystick means and said cursor has a color defined by said second joystick means.

15. The system of claim 14, further comprising means to clear the video monitor.

16. A system of claim 14, further comprising means to color the video monitor with a color corresponding to said second digital signals.

* * * * *

REEXAMINATION CERTIFICATE (2094th)
United States Patent [19]
Gussin

[11] B1 4,782,335
[45] Certificate Issued Sep. 21, 1993

[54] VIDEO ART ELECTRONIC SYSTEM

[75] Inventor: Edward L. Gussin, 5772 Ridgebrook Dr., Agoura Hills, Calif. 91301

[73] Assignee: Edward L. Gussin

Reexamination Request:
No. 90/002,841, Sep. 23, 1992

Reexamination Certificate for:
Patent No.: 4,782,335
Issued: Oct. 30, 1986
Appl. No.: 925,653
Filed: Nov. 1, 1988

[51] Int. Cl.⁵ .................................................. G09G 3/02
[52] U.S. Cl. .................................. 340/709; 340/703; 273/438
[58] Field of Search ................................ 340/705

[56] References Cited

U.S. PATENT DOCUMENTS

| | | | |
|---|---|---|---|
| Re. 31,736 | 11/1984 | Mueller et al. | 364/900 |
| 4,200,867 | 4/1980 | Hill | 340/703 |
| 4,342,029 | 7/1982 | Hofmanis et al. | 340/703 |
| 4,695,832 | 9/1987 | Jacobson | 340/709 |

FOREIGN PATENT DOCUMENTS

8203712  10/1992  World Int. Prop. O.

OTHER PUBLICATIONS

Devlin, "Graphics and Music for the Color Computer", Creative Computing Magazine, Dec., 1983, pp. 97-98.
Smith, "Electronics: Circuits and Devices", Second Edition, published by John Wiley & Sons, Inc., 1980, p. 237.

*Primary Examiner*—Alvin E. Oberley

[57] ABSTRACT

A video art electronic system for drawing and coloring on a conventional color television video monitor includes a first joystick for drawing and a second joystick for coloring. The operation is in real time and is simple enough for a child to operate.

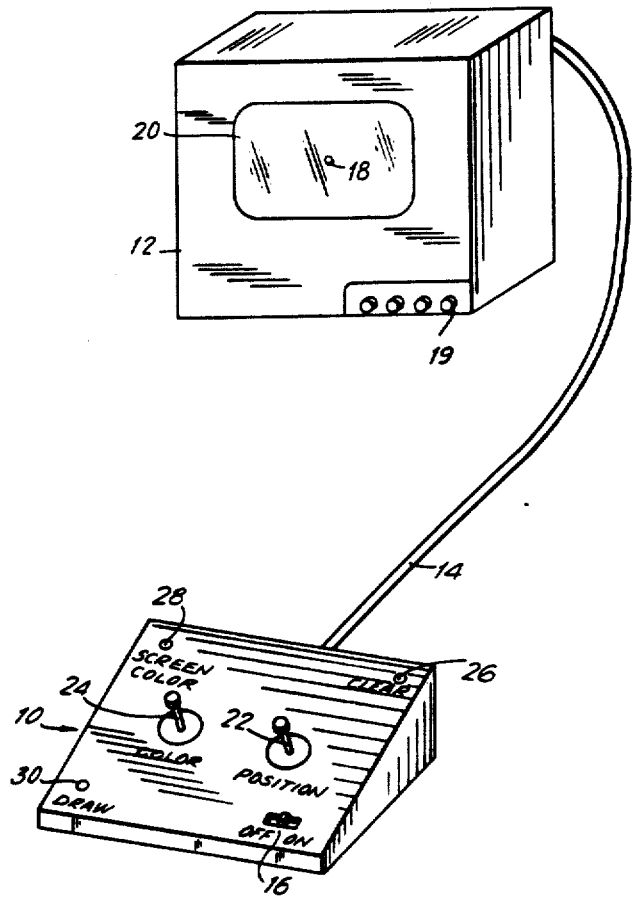

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 3–16 is confirmed.

Claim 2 is determined to be patentable as amended.

2. A video art electronics system for drawing and coloring on a conventional color television video monitor including a television screen having predetermined pixels, said system comprising a first and a second member positionably movable by an [operatir] *operator*, the drawing and coloring being by way of real-time positional and color correspondence of a cursor movably displayed on the screen with the current positions of said first and second members, the position of said first member representing commanded position of the cursor on the screen and the position of said second member representing commanded color of the cursor, said system being operable in a first mode of drawing and coloring in which currently commanded position and currently commanded color of the cursor are replicated on the screen in real time on a durable and cumulatively up-to-date basis as a durable trace of the cursor movement, so that the screen durably displays the executed drawing and currently commanded coloring traces up-to-date, said system being operable in a second mode of not drawing and coloring in which the screen continues to display durably the traces as last previously brought up-to-date and in which the currently commanded position and color of the cursor are replicated by the cursor displayed on the screen, but without new and current formation of a durably displayed trace, said system further comprising:

a draw switch having a first position for invoking said first mode of drawing and coloring on the video monitor and a second position for invoking said second mode of not drawing and coloring on the video monitor;

*a pixel memory comprising a random access memory, and means operative in said first mode to store the commanded color of the cursor in said pixel memory;* and means operative in either mode and responsive to said first member to produce first digital signals representing the commanded "X" and "Y" coordinates of the pixel position of the cursor on the screen.

* * * * *